US008713033B1

(12) United States Patent
Stoverink et al.

(10) Patent No.: US 8,713,033 B1
(45) Date of Patent: Apr. 29, 2014

(54) INTEGRATED MONITORING IN PROBLEM MANAGEMENT IN SERVICE DESK

(75) Inventors: Rodney J. Stoverink, Belton, MO (US); Karena Lee Duett, Grain Valley, MO (US); Sherry Annette Ward McAlister, Olathe, KS (US); Markley Therin Henning, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1502 days.

(21) Appl. No.: 11/121,406

(22) Filed: May 4, 2005

(51) Int. Cl.
*G06F 7/00* (2006.01)
*G06F 17/00* (2006.01)
*G06F 17/30* (2006.01)

(52) U.S. Cl.
USPC .......... 707/758; 707/769; 707/703; 705/7.21; 705/7.12

(58) Field of Classification Search
USPC .............. 705/1, 80, 7; 717/121; 707/102
See application file for complete search history.

(56) References Cited

U.S. PATENT DOCUMENTS

| | | | | |
|---|---|---|---|---|
| 6,014,658 A | * | 1/2000 | Pretz | 707/2 |
| 6,029,258 A | * | 2/2000 | Ahmad | 714/46 |
| 6,256,773 B1 | * | 7/2001 | Bowman-Amuah | 717/121 |
| 6,876,993 B2 | * | 4/2005 | LaButte et al. | 706/47 |
| 6,957,186 B1 | * | 10/2005 | Guheen et al. | 705/1 |
| 7,120,643 B2 | * | 10/2006 | Dill | 707/102 |
| 7,159,237 B2 | * | 1/2007 | Schneier et al. | 726/3 |
| 7,167,844 B1 | * | 1/2007 | Leong et al. | 705/80 |
| 2002/0123983 A1 | * | 9/2002 | Riley et al. | 707/1 |
| 2003/0055804 A1 | * | 3/2003 | LaButte et al. | 706/50 |
| 2004/0107125 A1 | * | 6/2004 | Guheen et al. | 705/7 |

OTHER PUBLICATIONS

TRM GO-ITS 44 ITSM Terminology Reference Model Portable Guide V1.0. Apr. 2005; http://www.gov.on.ca/mgs/en/IAndIT/STEL02_047303.html.*
TRM (GO-ITS 44 ITSM Terminology Reference Model Portable Guide V1.0. Apr. 2005; http://www.gov.on.ca/mgs/en/IAndIT/STEL02_047303.html).*
Hewlett-Packard Development Company, L.P., "HP OpenView Service Desk 5.0 Software", www.managementsoftware.hp.com/buy, Oct. 2004, 4 pgs.
Hewlett-Packard Development Company, L.P., HP OpenView Service Desk Overview & Features, www.managementsoftware.hp.com, Jan. 24, 2005, 2 pgs.

* cited by examiner

*Primary Examiner* — Sherief Badawi
*Assistant Examiner* — Loan T Nguyen

(57) ABSTRACT

A system for monitoring incidents is provided. The system includes a problem management system, a first data store, a second data store, and a monitor. The first data store is accessible by the problem management system and can maintain information related to problems underlying incidents. The second data store is also accessible by the problem management system and can maintain information related to solutions for the problems underlying the incidents. The monitor can monitor the problem management system, the first data store, and the second data store for the number of times the first and second data stores are queried and for other information.

7 Claims, 3 Drawing Sheets

INTEGRATED MONITORING IN PROBLEM MANAGEMENT IN SERVICE DESK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to problem management systems. More specifically, but not by way of limitation, a method and a system are provided that integrate the monitoring of problems and solutions in a problem management system.

BACKGROUND OF THE INVENTION

In the operation of computing software, computing hardware, or other complex systems, incidents or problems impacting a desired outcome can arise. An enterprise operating such a system might have a problem management system in place to assist in identifying and resolving the incidents or problems. An incident may be defined as an occurrence that has a negative impact on a desired outcome. A problem may be defined as an underlying cause of one or more incidents. Several commercially available products, such as HP OpenView Service Desk, are available to automate and standardize the problem management process.

SUMMARY OF THE INVENTION

In one embodiment, a system for monitoring incidents is provided. The system includes a problem management system, a first data store, a second data store, and a monitor. The first data store is accessible by the problem management system and can maintain information related to problems underlying incidents. The second data store is also accessible by the problem management system and can maintain information related to solutions for the problems underlying the incidents. The monitor can monitor the problem management system, the first data store, and the second data store for the number of times the first and second data stores are queried and for other information.

In another embodiment, a method for monitoring incidents is provided. The method includes identifying an incident; assigning the incident to a resolution agent; isolating a root cause for the incident; initiating an implementation of a solution for the incident; conducting a change management process for the incident; and monitoring for various aspects of the incident during the isolating of the root cause, during the initiating of the implementation, and during the conducting of the change management process.

In yet another embodiment, a system for managing problems is provided. The system includes a problem management system, a first data store, a second data store, and a monitor. The problem management system includes a first component that can identify an incident, a second component that can assign the incident to a resolution agent, a third component that can isolate a root cause for the incident, a fourth component that can initiate an implementation of a solution for the incident, and a fifth component that can conduct a change management process for the incident. The first data store component is accessible by the problem management system and can maintain information related to problems underlying incidents. The second data store component is also accessible by the problem management system and can maintain information related to solutions for the problems underlying incidents. The monitor can monitor the problem management system, and the first data and second data store components.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A problem management system might include procedures for identifying, logging, and prioritizing incidents and problems and for assigning incidents and problems to the appropriate resolution agent. The resolution agent might isolate the root cause of a problem, recommend solution alternatives, and ensure that the appropriate solutions are implemented. Records of the incidents and problems and of the solutions implemented to resolve them might be retained in one or more databases.

In an embodiment, not only are records of incidents and problems stored in databases, but the incidents, problems, and database records are monitored to facilitate the resolution of problems. That is, the problem management system and the databases might be monitored for information such as the number of queries to a database, whether a new incident is related to a previous incident, whether a change request is related to an incident, the activities of problem managers, the schedule for implementing solutions for problems, and other information. Monitoring this information can aid in identifying trends in problems and solutions and in finding long-term solutions where only workaround solutions previously existed.

Figure 1:
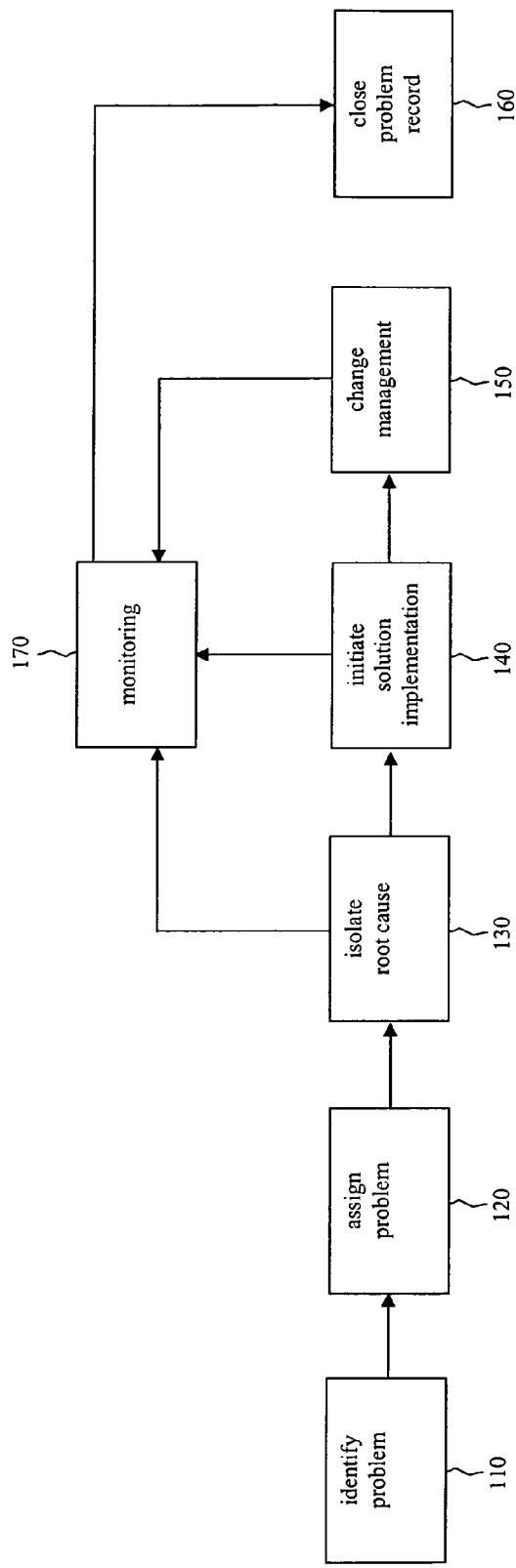
FIG. 1 illustrates a problem management process according to an embodiment of the present disclosure.

Procedures in a problem management system in which the monitoring might occur are illustrated in FIG. 1. In box 110, a problem is identified. That is, an analysis of data related to one or more incidents might indicate that a problem exists. Multiple incidents or problems can be observed and commonalities among them can be sought. Problem identification 110 can include identifying trends in incidents or problems and using those trends to define which aspects of the incidents or problems are to be monitored.

In box 120, a problem record or ticket can be created to keep track of information related to the problem. The problem might then be prioritized and assigned to an appropriate problem manager. In some cases, multiple individuals might be involved in the management of an incident. For example, one or more individuals might identify a problem, diagnose a problem, provide the hands-on services needed to resolve a problem, oversee the problem resolution, or manage information related to the problem resolution. As used herein, the term "problem manager" will refer to any individual or group of individuals filling any of these roles. It should be understood that the term "problem manager" may also be used to refer to different individuals or groups at different points in a problem management process.

In box 130, the problem manager isolates a root cause of the problem. This might include diagnosing a problem, determining and isolating a root cause for the problem, creating a workaround for the problem, determining whether a workaround is appropriate or whether a long-term solution should be sought, and updating a database containing problem-related knowledge.

In box 140, the implementation of a solution to the problem is initiated. This might include recommending multiple alternative solutions, reviewing the alternatives, and approving one of the alternatives for implementation. The database of problem-related knowledge might again be updated. The approved solution might then be assigned to a solution implementer, which may or may not be the same individual or group as the problem manager.

In box 150, a change management process might be initiated to resolve the problem. The change management process might include the creation of a request for change (RFC) that describes the measures proposed to be taken to resolve the problem, an approval or rejection of the RFC, the implementation of the measures described in an approved RFC, and other steps. When a problem has been resolved, the problem record or ticket can be closed in box 160.

Additional steps and decision points might be present in a problem management system but are not shown in FIG. 1 for the sake of clarity in the drawing. For example, a decision might be made at box 120 whether or not a problem is appropriate for processing by the problem management system. If it is not, the problem might be sent directly to box 160 where the problem record is closed. In box 130, a root cause might not be isolated and the problem might be sent directly to box 160 where the problem record is closed. In box 140, a proposed solution might not be approved and might be sent back to box 130 for further isolation of a root cause. Alternatively, a proposed solution might be approved in box 140, but in the change management process 150, an RFC to implement the proposed solution might be denied for various reasons, such as a lack of funding. Other alternative paths in a problem management process will be apparent to one of skill in the art.

Monitoring 170 of incidents, records, and other components of a problem management system can occur at several points in a problem management process. The monitoring 170 might be performed by a monitoring agent that is part of a system such as that illustrated in FIG. 2. In this system, a help desk 210 or a similar component receives requests for assistance with incidents. The help desk 210 would typically consist of one or more technicians who are knowledgeable in the field in which the incidents might arise and who have access to a problem management system 220.

The problem management system 220 might be an automated system for managing information and records pertaining to the incidents that might be received by the help desk 210. HP OpenView Service Desk is one example of a system that might be appropriate for use as the problem management system 220. Alternatively, numerous other commercially available products similar to Service Desk will be familiar to one of skill in the art and could be used as the problem management system 220. The problem management system 220 might have access to a database 230 of problems that have occurred in the past and to a database 240 of knowledge related to solutions that have been implemented or might be implemented to deal with the problems.

The problem database 230 might be a component in a ticketing system used for creating, distributing, and maintaining problem records. The ticketing system might be accessible only by technicians and might be used to convey highly technical information related to problems and their solutions. Thus, in addition to problem information, the problem database 230 might contain detailed information that has been input by the technicians to describe various solutions that have been attempted for problems. Some of these attempted solutions may not necessarily be the ideal solution for a problem and the descriptions of the solutions may be difficult for a general user to understand.

The knowledge database 240, on the other hand, typically contains information on solutions that have been determined to be effective. The knowledge database 240 is accessible by general users and the descriptions of the solutions are written in non-technical language that is comprehensible to general users. Thus, both technicians and general users might query the knowledge database to find one or more recommended solutions for a problem.

Figure 2:
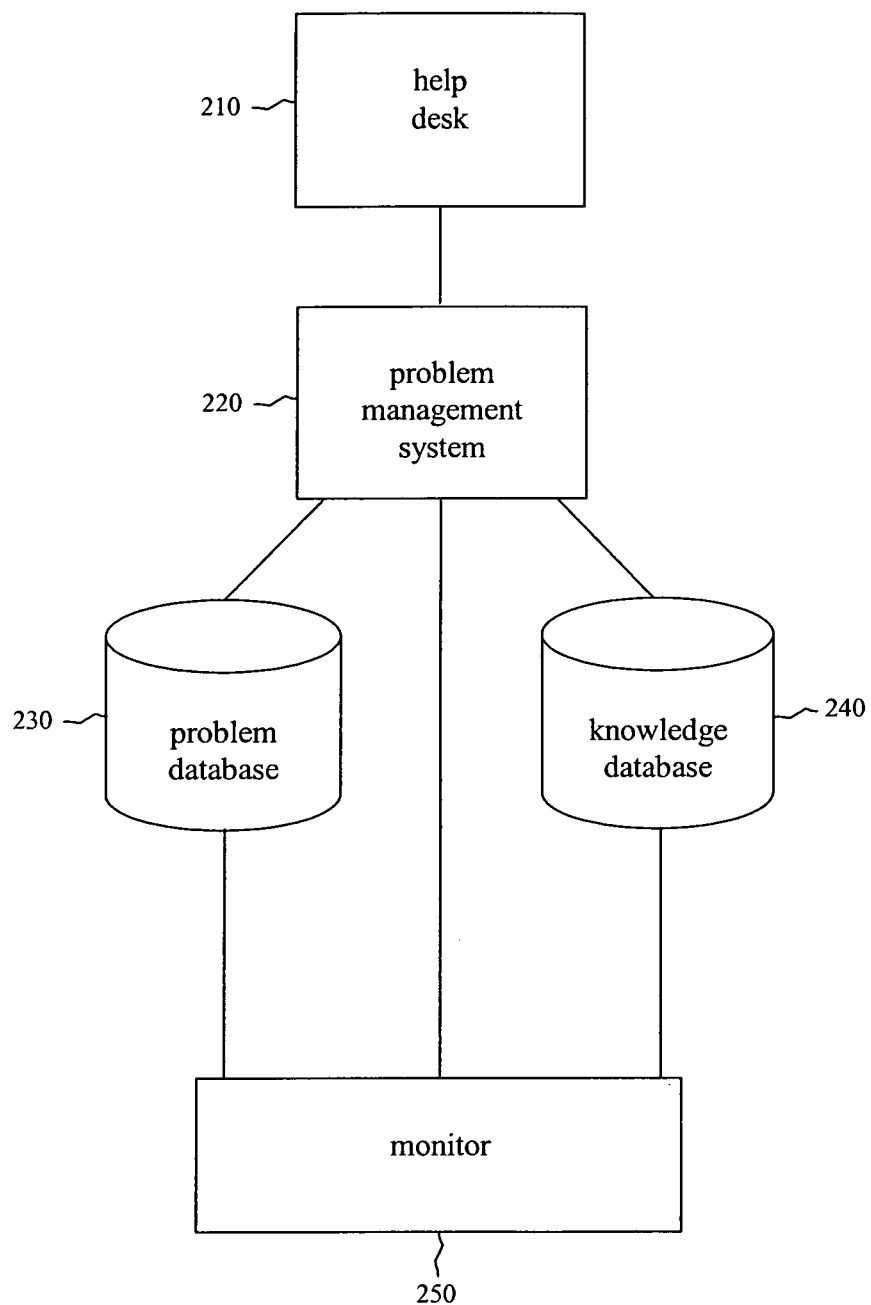
FIG. 2 illustrates a system for monitoring information in a problem management system according to an embodiment of the present disclosure.

While the problem database 230 and the knowledge database 240 are shown in FIG. 2 as separate entities, they could be combined into a single database. For example, a single database might be used by a ticketing system to maintain technical information about problems and their proposed or attempted solutions. A separate field or set of fields in the single database might be used to maintain plain-language descriptions of preferred solutions to problems. As used herein, the terms "database", "data store", and the like can refer to discrete data storage entities or to data storage components within such entities.

Upon receiving a request for assistance with an incident, a technician at the help desk 210 might use the problem management system 220 to create and store a ticket or some other record of the incident in the problem database 230. In some cases, the technician might possess sufficient knowledge to resolve the incident without consulting the problem database 230 or the knowledge database 240 for assistance. In other cases, the technician might search the problem database 230 and/or the knowledge database 240 to find a solution for the incident. In yet other cases, the technician might initiate a problem management process such as that shown in FIG. 1 in order to resolve the incident. Also, users may be given direct access to the problem database 230 and the knowledge database 240 so that they can attempt to solve their incidents themselves. For example, a web page might be set up on the Internet or an intranet that allows users to search the problem database 230 and the knowledge database 240 for information related to a problem they are experiencing.

In any of these cases, information regarding the incident and the solution can be stored in the problem database 230 and/or the knowledge database 240. For example, information stored in the problem database 230 and/or the knowledge database 240 might include whether or not an attempted solution was successful, a preferred method for implementing a solution, alternative solutions that might be attempted, and the situations in which the alternative solutions might be appropriate. This information is then available for use by the help desk 210 or by individual users in resolving future incidents.

In an embodiment, the problem management system 220, the problem database 230, and the knowledge database 240 are monitored by a monitor component 250. The monitor 250 might be a human who manually inspects incident-related information, an automated component that automatically inspects incident-related information, or a combination of human and automated components. The monitor 250 typically looks for previously identified relationships among incidents or problems. Records of relationships that are found can be stored in the problem database 230 and/or the knowledge database 240 and made available for use in resolving future incidents or problems.

Items that might be monitored include incidents and whether new incidents can be associated with an existing problem, the number and nature of the queries that are made to the problem database 230 and/or the knowledge database 240, RFC's and whether any changes have been made to an RFC, the activities of the problem managers, the schedule for the implementation of a solution to a problem, the relationships between problems and whether related problem tickets are being properly associated, and changes that might be made without an RFC. All of these items can be associated with each other so that a single ticket or other record contains links to all information potentially relevant to a single incident or a single problem. A single monitor 250 is able to look at all of this information at one time at various points in a problem management process.

In looking at incidents, the monitor 250 can determine whether new incidents have occurred that can be associated with an existing problem. Incidents that occurred since the last time monitoring took place or since a ticket was originally logged can be observed. When multiple related incidents continue to occur, the solution that has been offered for the incidents may be deemed ineffective and a more effective solution might be sought.

A help desk technician receiving a request for assistance or an individual user performing self-assistance might tap the problem database 230 and/or the knowledge database 240 to find an appropriate solution for a problem. The monitor 250 can look at the number and nature of hits made by the help desk 210 and/or individual users to the problem database 230 and/or the knowledge database 240 and can reach conclusions on the effectiveness of the solutions. Monitoring may identify that information about a particular problem has been retrieved frequently from the problem database 230 or that the same solution has been retrieved frequently from the knowledge database 240. A better solution to the problem may be sought in such a case and if one is discovered it may be stored in the problem database 230 and/or the knowledge database 240 as a preferred solution.

The problem database 230 and the knowledge database 240 may also be accessed during a problem management process where a root cause for a problem is identified and a solution is implemented. Relevant entries in the problem database 230 and the knowledge database 240 can be monitored to determine how often they are retrieved.

Another issue addressed by the monitor 250 is whether any changes have occurred in an RFC. The status of the RFC is monitored for amendments, notes, rejection or approval, progress, and schedule. A change to an RFC can trigger an alert that prompts an examination of the impact of the change. There might be a notification to a problem manager if a change to an RFC is denied or rescheduled. The monitor 250 actively looks at RFC's for a change in status, rather than passively waiting to be informed of a change to an RFC or the completion of an RFC.

The activities of the problem managers can also be observed by the monitor 250. Monitoring the problem managers' activities in relation to problem tickets, knowledge management reports, and the problem database 230 and knowledge database 240 can provide additional information about problems and their solutions.

Expected implementation dates for solutions to problems can be stored in the problem database 230 and in the knowledge database 240 and can be observed by the monitor 250. If the monitor 250 observes that a workaround solution for a problem is frequently being used and that a permanent solution to the problem is not scheduled for implementation until a much later date, the permanent solution might be moved to an earlier date.

The monitor 250 can also observe whether related pieces of information are being properly associated with each other within a problem ticket and whether related tickets are being properly associated with each other. If the monitor 250 discovers that an appropriate association has not been made, the association can be made, and if the monitor 250 discovers that an inappropriate association has been made, the association can be removed.

The monitor 250 can also keep track of solutions that are not approved, solutions that are approved but that are not implemented due to lack of funding or other reasons, and solutions for which an RFC is not required.

All of the above information can be tied together through a single ticket number or some other means of associating related information. The information can then be stored in the problem database 230 and/or the knowledge database 240 where it is available to assist the help desk 210 and other users. Having in a single location all the information related to a single incident or a single problem can facilitate the discovery of a solution to the incident or problem and can aid in identifying trends in incidents or problems.

The monitor 250 can examine the records of this information on a regular basis and make the results of the examination available to a problem manager. In this way, all information related to a single incident or problem is available to a single entity at one time and the entity can make decisions regarding an incident or a problem based on all available information. Over the course of a lengthy problem management process, different problem managers might review the results provided by the monitor 250 at different times. At any one time, however, only one problem manager reviews the results, rather than different entities reviewing different pieces of information.

Monitoring can occur at several points in a problem management system such as that illustrated in FIG. 1. Prior to monitoring, during problem identification 110, a trend analysis can be performed where a trend expert looks at information about incidents and how they might be related and about incident-related hits on the problem and knowledge databases. The trend expert might identify a group of incidents as a single problem.

Monitoring 170 typically begins at box 130 after trends have been identified and a root cause has been isolated. The monitoring 170 can be turned on at that point to look for related items identified in the trend analysis.

During root cause isolation 130, a workaround for a problem can be sought. It can be determined whether a viable workaround exists that will generally be appropriate for the problem or whether some other solution should be sought. Records of one or more solutions can then be stored and made available for users who may potentially face similar problems. Monitoring 170 can be done to determine how often the solution records are accessed.

Monitoring 170 can continue during solution implementation 140. If a solution for a problem has been identified, but a request for change is denied, monitoring 170 for related incidents might continue while a new root cause is isolated or a new solution is sought. When a new solution is approved, information about the old and new solutions can be stored and monitoring 170 might observe the effectiveness of the new solution.

Monitoring 170 can also occur during change management 150. For example, records related to RFC's and to successful and unsuccessful changes can be monitored.

Monitoring 170 can continue for a designated period of time, 30 days for example, after a change has been implemented. During this time, it can be observed whether any new tickets related to the change are generated. Since it is possible for problems to recur after they are thought to have been resolved, this extended monitoring can ensure that a solution is working as planned. The extended monitoring period might start from the date of the change implementation, from the date of the closing of the ticket, or from some other appropriate date. The same items that were monitored during the implementation of a solution can be monitored after implementation.

The information obtained in the monitoring can be used to initiate various actions. For example, monitoring information might be used to justify the cost of implementing a permanent solution for a problem rather than continuing to use a workaround solution. If monitoring indicates that a particular workaround solution is heavily used by a great number of users, a permanent solution might justifiably be sought. If a particular workaround solution is only rarely used, on the other hand, the cost of finding a permanent solution might not be justified.

As another example of the use of monitoring information, the frequency of use of a workaround solution after the implementation of a permanent solution for the same problem could indicate the effectiveness of the permanent solution. If the workaround solution is rarely used, the permanent solution might be deemed effective, but if users continue to use the workaround solution after the permanent solution has been implemented, the permanent solution might be considered ineffective.

In another example, the effectiveness of a workaround solution or a permanent solution might be judged based on feedback from users. If numerous users report that a recommended solution does not have the desired effect, the solution might need to be revised or a different root cause might need to be isolated.

Figure 3:
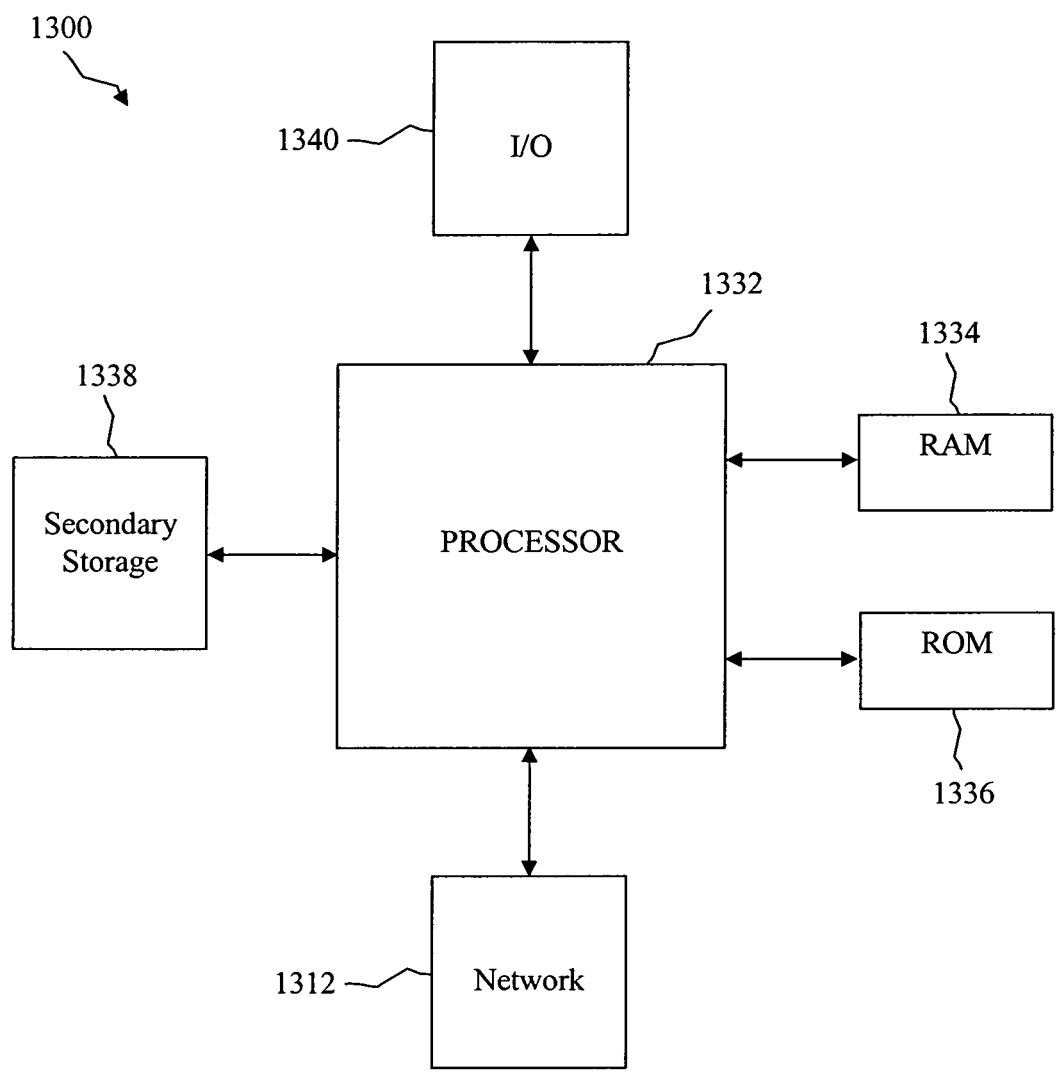
FIG. 3 is a block diagram of a computer system operable for some of the various embodiments of the present disclosure.

An integrated monitoring system as described above may generally be implemented on a variety of different computer systems. FIG. 3 illustrates a typical, general-purpose computer system suitable for implementing the present invention.

The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that Integrated Monitoring in Problem Management may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

The invention claimed is:

1. A system for managing problems comprising:
   a problem management system including:
      a first component that identifies an incident;
      a second component that assigns the incident to a resolution agent;
      a third component that isolates a root cause for the incident;
      a fourth component that initiates an implementation of a solution for the incident; and
      a fifth component that conducts a change management process for the incident;
   a first data store component accessible by the problem management system that maintains information related to problems underlying at least one incident;
   a second data store component accessible by the problem management system that maintains information related to solutions for the problems underlying at least one incident; and
   a monitor, with a processor and memory, that monitors the problem management system, the first data store component for problem information, and the second data store component for solution information, wherein the monitor monitors a plurality of incidents including the incident, whether new incidents are associated with an existing problem, a number and nature of queries that are made to the first and second data stores, requests for change and whether any changes have been made to any of the requests for change, activities of problem managers, a schedule for implementation of a solution to a problem, relationships between problems and whether related problem tickets are being properly associated, and changes that might be made without a request for change, wherein the monitor links a record of the incident with information for any related previous incidents and information related to at least some of the monitored items and at least one of the incident or the related previous incidents, and wherein the solution for the incident is chosen for implementation from a plurality of solutions in the second data store based on information obtained by the monitor.

2. The system of claim 1, wherein the information observed by the monitor is the number of times the solution in the second data store component is queried.

3. The system of claim 1, wherein the first and second data store components are further defined as separate data stores.

4. The system of claim 1, wherein the first and second data store components are further defined as part of the same data store.

5. The system of claim 1, wherein problem and solution information observed by the monitor is determined by an analysis of a trend in a set of related incidents.

6. The system of claim 5, wherein solution information obtained by the monitor is placed in a single record and stored in at least one of the first and second data store components.

7. The system of claim 6, wherein the monitor continues collecting information after a solution for an incident has been implemented.

* * * * *